A. YOUNGS.
HAND GRIP.
APPLICATION FILED JAN. 15, 1912.
1,064,587.
Patented June 10, 1913.
2 SHEETS—SHEET 1.
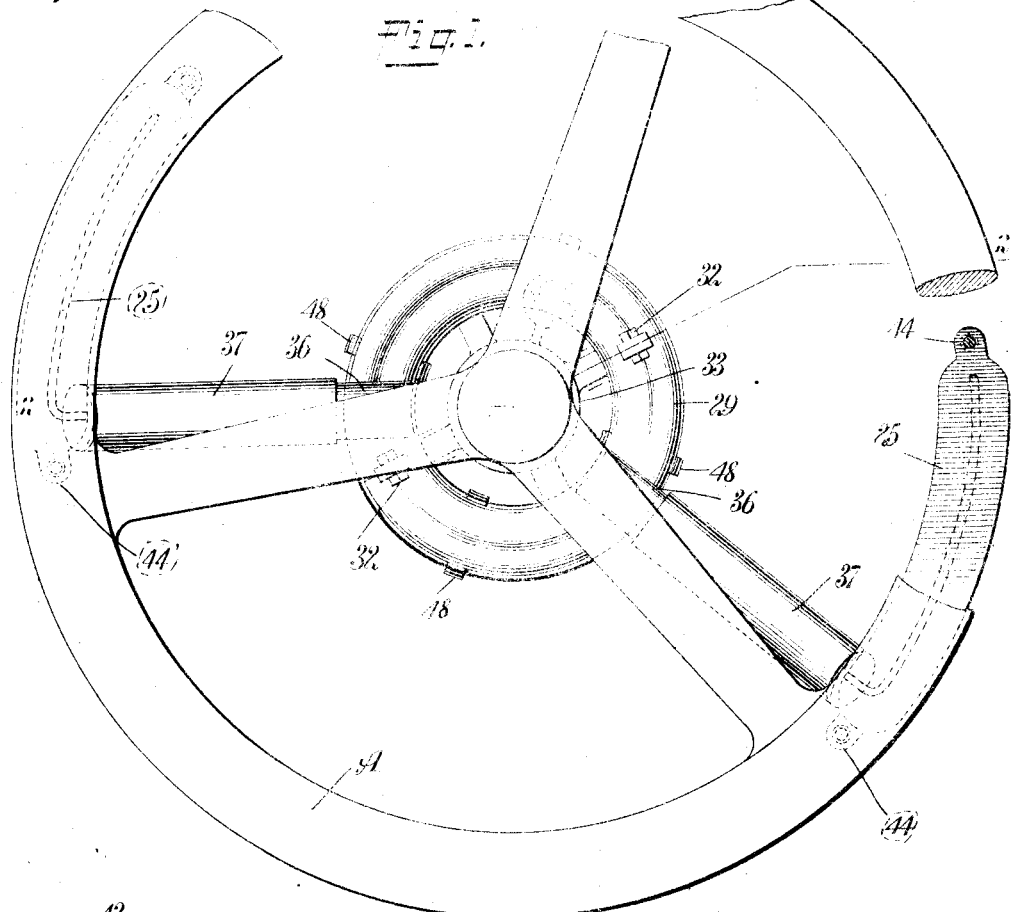
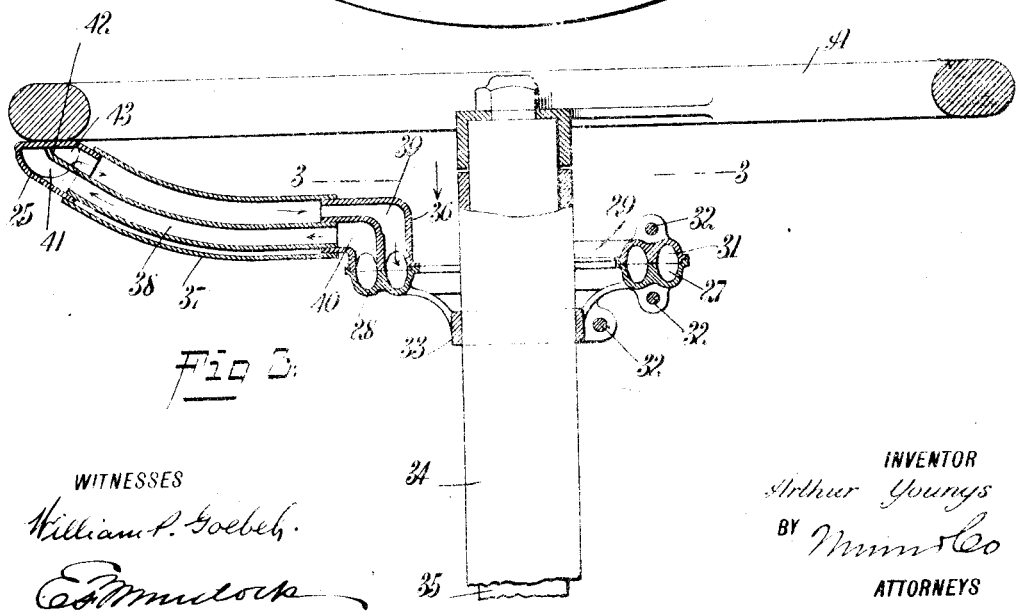
WITNESSES
INVENTOR
Arthur Youngs
BY Munn &Co
ATTORNEYS

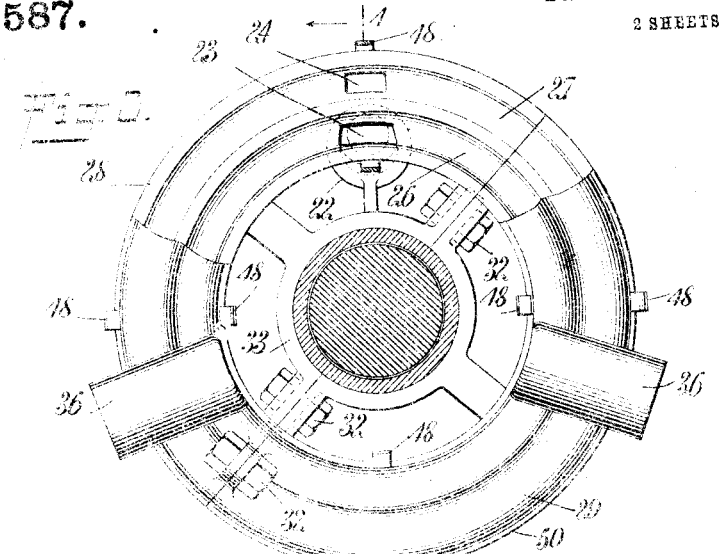
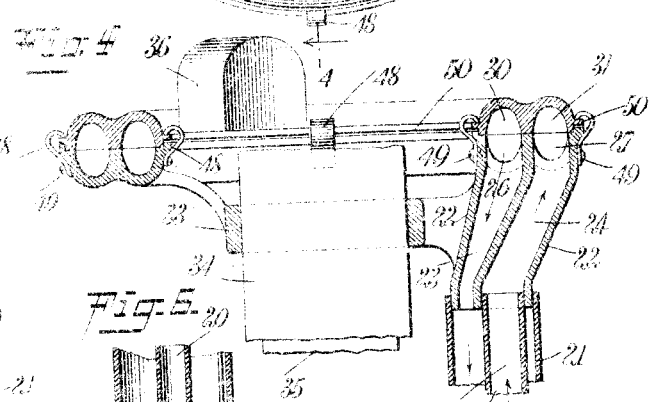
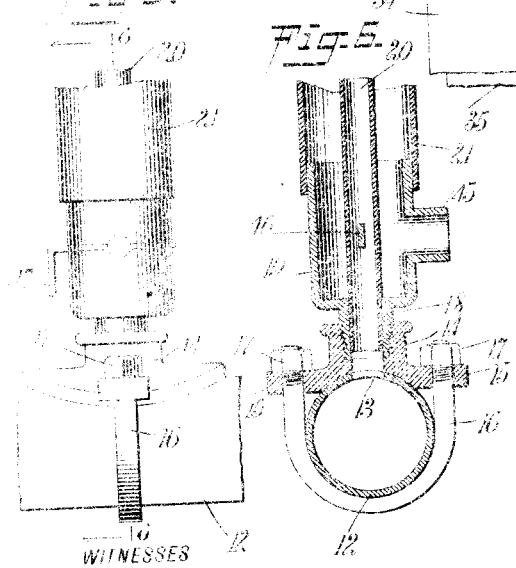
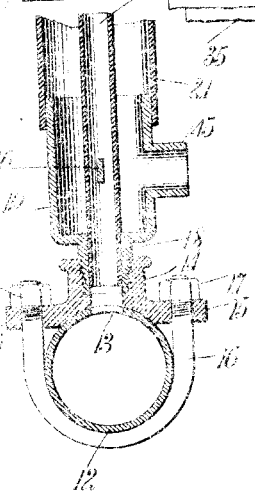
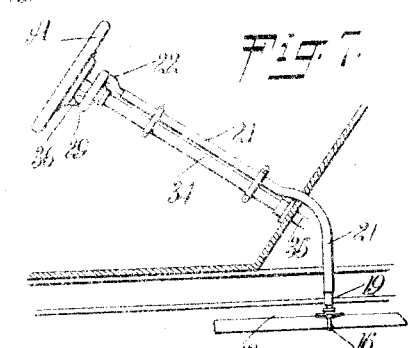

UNITED STATES PATENT OFFICE.

ARTHUR YOUNGS, OF NEWBURGH, NEW YORK.

HAND-GRIP.

1,064,587.

Specification of Letters Patent. Patented June 10, 1913.

Application filed January 15, 1912. Serial No. 671,151.

*To all whom it may concern:*

Be it known that I, ARTHUR YOUNGS, a citizen of the United States, and a resident of Newburgh, in the county of Orange and State of New York, have invented a new and Improved Hand-Grip, of which the following is a full, clear, and exact description.

Among the principal objects which the present invention has in view are: to provide a heating system constructed and arranged to warm the hands of a steersman or operator of a motor or other driven vehicle where the controlling devices are in exposed positions; to provide an attachment for heating the hands of an operator, under the above mentioned conditions, which may be removed and replaced at will from or upon the controlling device; and to provide an attachment of the character mentioned adapted for installation upon standard controlling devices.

Reference is to be had to the accompanying drawings forming a part of this specification in which like characters of reference indicate corresponding parts in all the views, and in which—

Figure 1 is a top plan view of an automobile steering wheel having attached thereto a heating attachment constructed and arranged in accordance with the present invention; the rim of the wheel has been partly cut away to show the structure of the hand radiator; Fig. 2 is a cross section of the steering wheel taken on the line 2—2 of Fig. 1; Fig. 3 is a cross section of the steering post taken on the line 3—3 of Fig. 2, showing a top plan view of the coupling plates, the upper plate being partly cut away to disclose the lower plate; Fig. 4 is a cross section of the coupling plates taken on the line 4—4 of Fig. 3; Fig. 5 is a detail view, in side elevation, of the means provided for coupling the heating system, herein described, with the exhaust or other pipe containing the heating medium connected with the motor of a vehicle; Fig. 6 is a vertical section taken on the line 6—6 of Fig. 5; and Fig. 7 is a pictorial view, in side elevation, showing the steering post of an automobile having applied thereto hand grips, and a heating system connected therewith, constructed and arranged in accordance with the present invention.

As shown in the accompanying drawings, the attachment is supplied with heating medium from the exhaust of an internal combustion engine. The same construction and arrangement would be used in conjunction with a motor employing steam. The particular arrangement of the piping herein shown and described would not be essential when the heating medium employed is an electric current.

When employing gas or steam, the same is preferably taken from the exhaust pipe 12. For this purpose the exhaust pipe 12 is provided with an opening 13. The opening 13 is provided to register with a central bore of a pipe nipple 14, said nipple having a hollow under surface to straddle the pipe 12 to form with the outer surface thereof a steam or gas sealed joint. If found necessary, any suitable form of gasket or other packing may be employed at this point of the structure. Extended laterally from the nipple 14 are brackets 15, 15. The brackets 15, 15 are properly perforated to receive the threaded end of a cinch clip 16. The clip 16 is furnished with nuts 17, 17 which, when properly set up, forces the nipple 14 firmly upon the pipe 12. The nipple 14 is suitably tapped with a tapered hole to receive a nipple 18 extended from the lower end of a coupling 19. Extended within the nipple 18, and having a drive fit therewith, is a small feed pipe 20. The pipe 20 extends upwardly through the coupling 19 and a casing 21. The casing 21 fits over with a driven or other suitable joint to inclose the cylindrical surface of the double channeled coupling 22. The coupling 22 is shaped substantially as shown in Fig. 4 of the drawings. Within the cylindrical chamber 23 of the coupling 22 is a channel 24, which channel 24 registers with the pipe 20. The casing 21 receives the return of the heating medium after the same has passed through the hand grips 25, 25.

The chamber 23 and the channel 24 are in open communication with the grooves 26 and 27 respectively (see Figs. 3 and 4). The grooves 26 and 27 are formed in the lower coupling plate 28. To register with the plate 28 is an upper coupling plate 29 having formed therein annular grooves 30 and 31, which grooves accurately overlie the grooves 26 and 27, combining therewith to form annular passages.

The plates 28 and 29 are preferably constructed in half circular sections, as seen best in Fig. 3 of the drawings. These sections are parted on a diameter and are secured rigidly by bolts 32, 32, as seen best in said figure.

The hub ring 33 cast with the plate 28 grips tightly the casing 34 for the steering post 35. The casing 34 being stationary, the plate 28 is thus held. In this manner the coupling 22, casing 21, and parts connected therewith, are suitably held in structural relation. In the operation of the invention, the plate 29 rotates with the steering wheel A, being connected thereto by a coupling 36, a casing 37, and the grips 25. In the preferred arrangement there are two couplings 36 extended upwardly from the plate 29, two casings 37 and two grips 25, as seen best in Fig. 1 of the drawings. The casings 37 and 21, and the pipes 20 and 38 contained therein, are preferably constructed from a suitable yielding material, such as lead or copper, so as to be adaptive to the structural needs of the installation.

The couplings 36 are similar in design to the couplings 22 in that they are provided with an outer chamber 39 and a reduced channel 40. The channel 40 is in open communication with the groove 31, with which the channel 24 is likewise in communication. The heating material therefor passing from the pipe 20 through the channel 24 to the passage formed by the grooves 27 and 31, passes from the said passage through the channel 40 to the pipe 38, and thence into the grips 25, 25 and into the outer chamber 41 thereof. The chamber 41 is formed by a partition 42 which divides the grips lengthwise. The partition 42 falls short of the far end of the grip 25, thereby providing an entrance to a chamber 43 with which the casing 37 registers and from which the return gas or steam is received.

The grips 25 are shaped substantially as shown in Figs. 1 and 2 of the drawings, having at each end thereof bolting tabs 44, 44, and around its under surface. When installed, the grips are disposed, as shown in Fig. 1 of the drawings, at opposite sides of the steering wheel and in the position most natural for the hand of the steersman to grip when the machine is running in the normal straight path. When the hand is incased, as is the custom, in a heavy driving glove, the warmth supplied by the heating medium passing through the grips 25 circulates within the glove and warms the hand of the driver.

It will be understood that when the grips 25 are applied to such devices as levers for controlling the current of motor cars, or when applied to such levers as are provided in switch houses in railroad yards for throwing the switches, the shape of the grips will be varied to suit the convenience of operation and the structure to which they are applied.

In the operation of the device when installed as shown in the accompanying drawings, the heating medium passes from the exhaust pipe 12 through the pipe 20 and the channel formed by the grooves 27 and 31 to the pipes 38, and thence through the two grips 25, 25. After passing through the grips 25, 25, the cooled gases or fluid are returned by the casing 37 to the passage formed by the grooves 26 and 30 to the casing 21, and thence delivered through the nipple 45 to the atmosphere.

To regulate the heat supplied to the grips 25, 25, there is provided in the pipe 20 a butterfly valve 46, the handle 47 of which is extended from the side of the nipple 19 and may be turned to limit the opening of the pipe 20 and to control the amount of heat medium to pass therefrom.

To maintain the contact between the plates 28 and 29, and to furnish a yielding joint therefor, I provide the spring snap clips 48 and 48. The clips 48, 48 are permanently secured by means of screws 49 upon the lower or under plate 28. The clips, as shown, are S shape, the hook of the S extending above the flanges 50, 50 extended from the edge of the plate 29.

Having thus described my invention, what I claim as new and desire to secure by Letters Patent is:

1. The combination with a controlling device, comprising a rotary member and a stationary member, of a hand grip having a plurality of hollow radiating chambers elongated and curved for mounting upon said rotary member; a plurality of plates having a plurality of annular grooves, said grooves arranged to register to form passages when said plates are overlaid; means for securing one of said plates rigidly upon said rotary member and the other of said plates upon said stationary member; a plurality of couplings having a return chamber and a supply channel, said chambers and channels in each of said couplings opening into said passages respectively; means for connecting said couplings with said radiating chambers; and means for supplying a heating medium to one of said passages and for exhausting said medium from the other of said passages.

2. The combination with a controlling device, comprising a movable member and a stationary member, of a hollow hand grip having circulating chambers; means for temporarily mounting said grip upon said movable member; a plurality of coupling plates, each provided with a plurality of annular grooves, said grooves in each plate being arranged to register with the grooves of the other plate to form semi-circular passages, said plates being constructed in sections which, when united, form complete circular passages; means for uniting said sections to form complete plates; means for uniting said complete plates to permit relative rotation thereof; means for mounting said plates, one upon said movable member and the other upon said stationary member; means for operatively connecting said passages and said circulating chambers of the hand grip; and means for supplying a heating medium to one of said passages and for exhausting said medium from the other of said passages.

In testimony whereof I have signed my name to this specification in the presence of two subscribing witnesses.

ARTHUR YOUNGS.

Witnesses:
   JOHN P. DAVIS,
   LAURENCE J. GALLAGHER.